US005485464A

United States Patent [19]
Strodtbeck et al.

[11] Patent Number: 5,485,464
[45] Date of Patent: Jan. 16, 1996

[54] COMMUNICATION PROTOCOL FOR A HIGH DATA RATE SATELLITE COMMUNICATION SYSTEM

[75] Inventors: Andrew L. Strodtbeck, El Segundo; Jennifer L. Vollbrecht, Hermosa Beach, both of Calif.

[73] Assignee: Hughes Aircraft Company, Los Angeles, Calif.

[21] Appl. No.: 141,779

[22] Filed: Oct. 21, 1993

[51] Int. Cl.$^6$ ............... H04B 7/185; H04J 4/00
[52] U.S. Cl. .............. 370/95.2; 370/50; 370/97; 370/110.1; 455/12.1; 455/21
[58] Field of Search .............. 455/4.1, 5.1, 12.1, 455/20, 21, 22; 348/6, 9, 13, 16; 370/50, 69.1, 71, 73, 76, 95.1, 95.2, 110.1, 75, 97

[56] References Cited

U.S. PATENT DOCUMENTS

5,239,540  8/1993  Rovira et al. ........................ 370/73
5,278,891  1/1994  Bhagat et al. ...................... 455/12.1

Primary Examiner—Benedict V. Safourek
Attorney, Agent, or Firm—Phyllis Y. Price; Wanda K. Denson-Low

[57] ABSTRACT

A communication protocol or method that provides for terminal access, data flow, call monitoring and terminal polling, and call termination between user terminals connected to a high data rate satellite communication system. An "Aloha" random access channel that forms part of a bent-pipe architecture is used in conjunction with orderwire uplink and downlink channels to permit the system to cleanly and simply establish its data links and thus provide terminal access. A network control center is used to assign a source user terminal to uplink and downlink channels. After the communication link is established, uplinked data is demodulated, and routed to every downlink beam where it is multiplexed with other data channels, then remodulated and downlinked to every user terminal. The orderwire uplink is only from the network control center to the satellite relay system, and uses the channel without demodulation and remodulation. The orderwire downlink is only from the satellite relay system to the user terminals, and uses the channels with demodulation and remodulation. Each user terminal monitors its orderwire downlink channel to recognize and extract messages addressed to it. Data flow, call monitoring and terminal polling is performed once the source and destination user terminals have been assigned their beams and frequency and time slots. Thereafter, data transfer between terminals is generally independent of the network control center. Input data generated at a source user terminal is multiplexed and transmitted to the satellite relay system. The satellite relay system demodulates the data, routes it so that it is retransmitted on a beam that communicates with the destination user terminal, remultiplexes and remodulates the data, and then transmits the multiplexed data to the destination user terminal. The network control center monitors the link so that system resources are not unnecessarily tied up if a connection is lost. This is achieved by causing both terminals to send periodic messages to the network control center indicating that they are active on the network, or the network control center may periodically poll each terminal and terminate a call if either terminal is unresponsive or provides a signal indicating that it has hung up. Several call termination procedures are also provided.

21 Claims, 6 Drawing Sheets

COMMUNICATION PROTOCOL FOR A HIGH DATA RATE SATELLITE COMMUNICATION SYSTEM

BACKGROUND

The present invention relates generally to satellite communication systems, and more particularly, to a communication protocol for use with a high data rate satellite communication system that provides data, voice and video communication between individuals.

The past several decades has seen the development of communications systems that have provided for the real-time distribution of information on a global scale. The development of these global communication systems has evolved along several paths that use either ground-based or satellite-based communication. Satellite-based systems have been employed for many years to distribute voice, data and video signals for global broadcasting of news and sporting events, for example. With the advent of newer high power satellite systems and technology, direct broadcast television systems are available that provide for broadcasting of television signals from up to 100 stations using a single satellite. Individuals install an antenna and a satellite receiver that receives the broadcasts directly by way of the satellite and display them on a television monitor.

In order to provide for more personal communication or teleconferencing between individuals, companies such as AT&T, for example, have developed a video telephone system that employs a small (3–4 inch) television monitor in combination with a conventional telephone. The video telephone system typically uses fiber optic links to provide a sufficient bandwidth to carry the video along with the voice signals. However, this type of system does not have enough bandwidth to provide for full motion video.

For many years multitudinous standards and protocols have been available for placing calls, setting up connections, monitoring communication link status, and tearing down calls on the terrestrial phone network, and also for establishing communications over data networks, and more recently, for transmission of digitized voice and data over a common network (ISDN). Furthermore, very small aperture terminal (VS AT) networks, consisting of a satellite, a hub, and many small VSAT user terminals have had the ability to transmit digital voice and data, interfacing almost transparently with terrestrial satellite networks. In this type of network link the satellite acts as a bit pipe, providing a network link between two terrestrial nodes, and is a two-hopped system with a hub in the middle to route calls, or packets.

In order to provide for an even more cost-effective solution to personal telecommunication needs, the assignee of the present has developed a high data rate satellite communication system that provides for the communication and distribution of full motion video, voice and data signals, to provide for personal teleconferencing between individuals. This system is disclosed in U.S. patent application Ser. No. 08/142,524, filed Oct. 21, 1993, entitled "High Data Rate Satellite Communication System", the contents of which are incorporated herein by reference. This high data rate satellite communication system comprises a plurality of very small user terminals (VSAT's) that are linked by and that communicate with each other by way of a satellite relay system. A network control center provides control signals that control the satellite relay system and coordinate linking of terminals to each other. The system employs frequency division multiplexing on uplinks from the terminals and the network control center to the satellite relay system. The system employs time division multiplexing on downlinks from the satellite relay system to the terminals and the network control center. However, other uplink and downlink multiplexing schemes may also be used.

However, in this new system, the satellite does not act like a link in the network. Interactive services, such as personal videoconferencing, and the like, will not tolerate a two-hop delay. Because of the on-board switching and routing capability, the satellite acts as a node. This new system must also accommodate a larger number of users, and larger number of potential users for packet switched or circuit switched data, but none-the-less must provide connection-oriented communications, although some connectionless communication may also be provided for. Thus, in this new system, resources are assigned to various communication source and destination terminals on a temporary call-by-call basis.

The satellite in this new system is no longer just a bit-pipe-in-the-sky. In addition to the normal setup protocols used in ISDN, for example, the additional problem of allocating satellite resources such as assigning uplink and downlink physical channels to source and destination user terminals must be solved. This problem is new to multibeam satellite communication architectures using digital traffic, on-board demodulation, routing and remodulation, with or without the use of FDM uplinks and TDM downlinks.

Therefore, because signal routing and switching is performed on-board the satellite of this new system, because this system is a one-hop system, and because the satellite interfaces with the network controller on the ground only when calls are set up, tom down or monitored, a new communication protocol is required to permit transfer of data and control signals between the various components that are interconnected by the system.

Accordingly, it is an objective of the present invention to provide for a communication protocol for use with a high data rate satellite communication system that provides for the communication of data, voice and video between individuals. These protocols build on existing standardized protocols, namely, ISDN. It is a further objective of the present invention to provide for a communication protocol for use with a high data rate satellite communication system that employs frequency reuse and onboard demodulation and routing or switching and a network control center for call setup, monitoring and teardown.

SUMMARY OF THE INVENTION

In order to meet the above and other objectives, the present invention is a communication protocol for use with a high data rate satellite communication system. The satellite communication system comprises a plurality of very small user terminals that are linked by and that communicate with each other by way of a satellite relay system. Communication is achieved from terminal to terminal in a single hop. A network control center provides control signals that control the satellite relay system and coordinate linking of terminals to each other. The system employs frequency division multiplexing on uplinks from the terminals and the network control center to the satellite relay system. The system employs time division multiplexing on downlinks from the satellite relay system to the terminals and the network control center, although other multiplexing schemes may be used on the uplink and downlink. Each user terminal comprises a transceiver for modulating and demodulating input and output data, and an antenna for transmitting and receiving encoded data to and from the satellite relay system. Additionally, a user terminal that is configured for receiving and transmitting video contains a data compression circuit for compressing input data and decompressing output data.

The satellite relay system is comprised of a satellite, a wide area antenna, a plurality of satellite receive antennas, a plurality of satellite transmit antennas, and a signal processor. The wide area antenna is provided for communicating control signals between the user terminals and the network control center. The plurality of satellite receive antennas operate in a first frequency band and produce a first plurality of beams that cover a predefined service area. The plurality of satellite receive antennas are adapted to receive time division multiplexed data from a source user terminal on a first beam. The plurality of satellite transmit antennas operate in a second frequency band and produce a second plurality of beams that cover the service area. The plurality of satellite transmit antennas are adapted to transmit the time division multiplexed data to a destination user terminal on a second beam. The second beam may be geographically colocated with the first beam, depending upon the respective locations of the source and destination user terminals.

The signal processor is adapted to demodulate frequency division multiplexed data received on the first beam from the source user terminal. It then routes the demodulated data so that it can be transmitted on the second beam to the destination user terminal. The signal processor then remodulates the demodulated data to provide encoded data comprising time division multiplexed data. Finally the signal processor transmits the time division multiplexed data on the second beam to the destination user terminal. It is to be understood that other multiplexing schemes may be used.

The present invention is a communication protocol or method that is as follows. Operational source and user terminals continually monitor downlink frequencies to determine which beam they are in. Each terminal scans through each of the four downlink frequencies at each of two polarizations and collects bit error measurements on known bits on the downlink data stream. Each terminal selects the strongest frequency determined by the fewest measured bit errors. Beam identification is embedded in framing information and this information is used by each terminal to identify which beam it is in.

A source terminal requests a physical channel to transmit on. This is known as call setup. Call setup is achieved by generating source and destination IDs and identifying which beam the source user terminal is in. The source user terminal then sends the above information to the network control center by randomly choosing among allowable frequencies within the wide area coverage beam, and organizing the data that is to be transmitted into a packet. This packet has a standardized format, called high-level data link control (HDLC), which is similar to the format used on the D channel in the ISDN.

The source user terminal bursts the packet to the satellite relay system where it is translated in frequency and amplified and sent to the network control center without using on-board demodulation or remodulation. This is known as a bent-pipe architecture. The network control center then accesses these packets as they are burst to it.

If there is no contention between the source and destination user terminals, in that two terminals are not trying to burst on the same channel at the same time, then an acknowledgement signal is sent to the source user terminal by the network control center by way of an "orderwire" channel. The network control center determines whether contention has occurred by computing a cyclic redundancy check (CRC) code for the packet and comparing this against the transmitted CRC.

If the source user terminal does not receive an acknowledgement signal after a sufficient time delay (for example, twice the geosynchronous altitude delay or about 0.25 seconds) then it waits another period of time, the length of which is chosen randomly to avoid contention occurring again and again, and retransmits the data packet. This is referred to herein as an "Aloha" random access technique. Along with the acknowledgement signal, the network control center assigns the source user terminal to a particular uplink channel and a downlink channel. The use of the present Aloha channel and technique permits the system to cleanly and simply establish its data links.

The orderwire uplink channel is the uplink channel of the network control center. A second uplink channel may be used to communicate with or to configure the router in the satellite relay system. The orderwire uplink processes information that is transmitted to the source and destination user terminals. This information is broadcast, or more precisely multicast on preassigned agreed upon channels of every downlink beam. Thereafter, the uplinked data is demodulated, routed to every downlink beam where it is multiplexed with other data channels, then remodulated and downlinked to every user terminal. The orderwire uplink is only from the network control center to the satellite relay system, and uses the channel without demodulation and remodulation. The orderwire downlink is only from the satellite relay system to the user terminals, and uses the channels with demodulation and remodulation. Each user terminal monitors its orderwire downlink channel to recognize and extract messages addressed to it.

Next, the network control center calls the destination user terminal. Again, this takes place by way of the orderwire channel. The destination user terminal accesses data addressed to it off the orderwire channel, and if it is not busy, it sends an OFFHOOK message to the network control center using the Aloha channel along with data indicative of which beam it is in. Acknowledgement from the network control center is performed by way of the orderwire channel, and the destination user terminal is assigned its uplink channel and downlink channel (frequency for FDM, and time slot for TDM). Other multiplexing schemes may also be readily employed.

Data flow, call monitoring and terminal polling is as follows. Once the source and destination user terminals have been assigned their beams and frequency and time slots, the network control center reconfigures the routes to setup the end-to-end data link. Thereafter, data transfer between terminals is generally independent of the network control center. Once the communication link between the user terminals is established, input data generated at a source user terminal is multiplexed and transmitted to the satellite relay system. The satellite relay system demodulates the data, routes it so that it is retransmitted on a beam that communicates with the destination user terminal, remultiplexes and remodulates the data, and then transmits the multiplexed data to the destination user terminal. However, it is necessary for the network control center to monitor the calls so that system resources are not unnecessarily tied up if a connection is lost. This is achieved by causing both terminals to send periodic messages to the network control center indicating that they are active on the network, or the network control center may periodically poll each terminal and terminate a call if either terminal is unresponsive or provides a signal indicating that it is ONHOOK (has hung up).

Call termination is as follows. If a call is terminated, in that the network control center received a HANGUP signal from one terminal or either terminal is unresponsive to polling, or either terminal fails to send a monitoring message to the network control center within a required time period, a number of system resources are released. These resources include the uplink channels for both terminals including the satellite demodulators, the downlink channels for both terminals and the path through the router 80 that was reserved for the terminals. Signals are sent to both terminals by way of the orderwire channel to cease transmitting. Each terminal may then send an acknowledgement signal by way of the Aloha channel (wide area coverage beam) to the network control center to reduce interference with other terminals.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
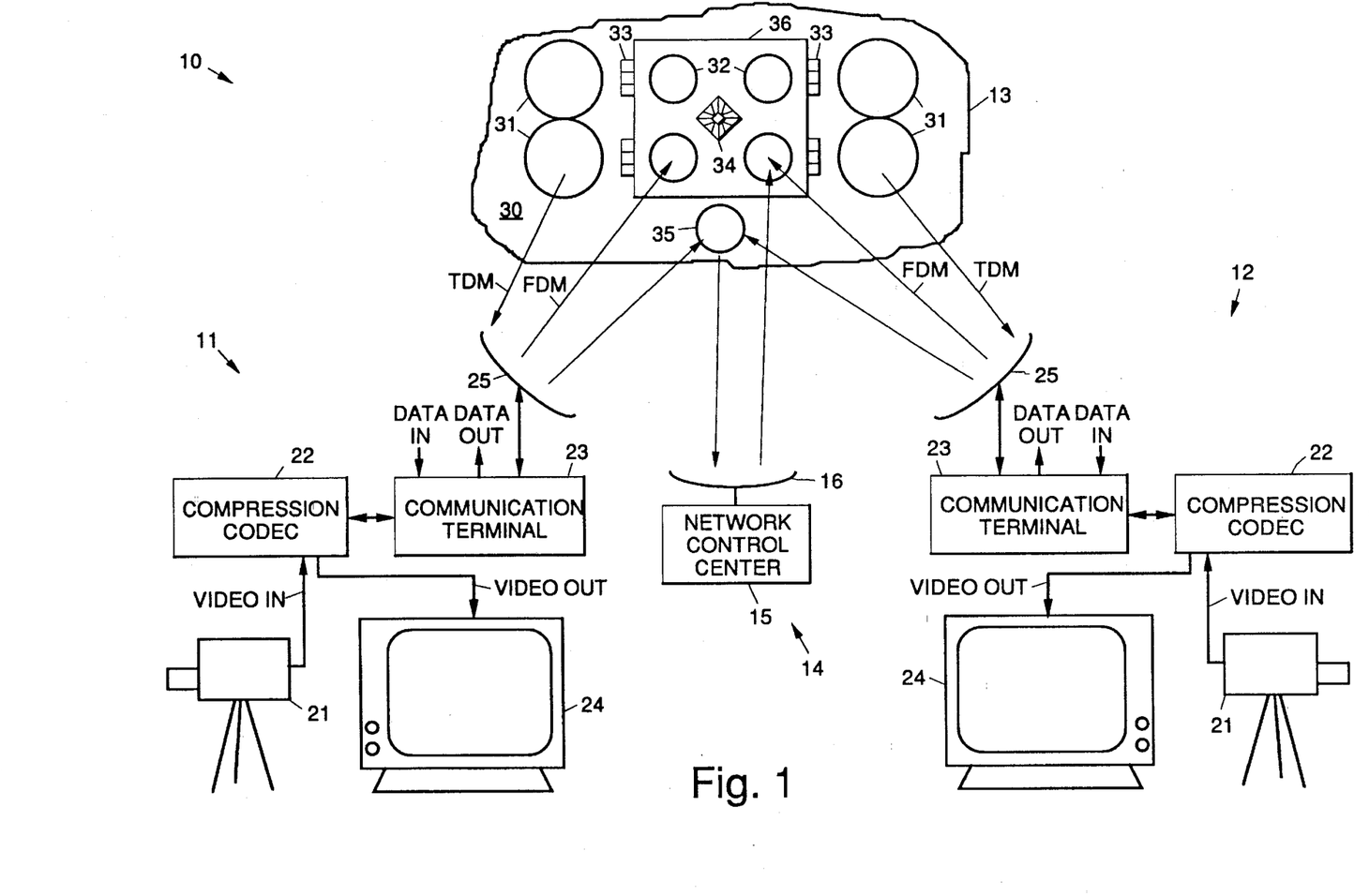
FIG. 1 illustrates a high data rate satellite communication system in which the present invention may be employed.

Referring to the drawing figures, FIG. 1 illustrates a high data rate satellite communication system 10 in which the present invention may be employed. The system 10 comprises a plurality of very small user terminals 11, 12 (corresponding to first and second user terminals 11, 12) that are linked by and that communicate with each other by way of a satellite relay system 13. A network control center 14 provides control signals that control the satellite relay system 13 and coordinate linking of terminals 11, 12 to each other. The system 10 employs frequency division multiplexing on uplinks from the terminals 11, 12 and the network control center 14 to the satellite relay system 13. The system 10 employs time division multiplexing on downlinks from the satellite relay system 10 to the terminals 11, 12 and the network control center 14.

Each user terminal 11, 12 comprises a data compression coder/decoder (CODEC) circuit 22 for compressing input data and decompressing output data, a transceiver 23 for modulating and demodulating input and output data, and an antenna 25 for transmitting and receiving encoded data to and from the satellite relay system 13. In the alternative, and in the case of data communication (opposed to video), the compression circuit 22 is replaced by interface circuitry that is adapted to interface to a data source, such as a local area network, a terminal or computer, or a data communication line, or the like. The satellite relay system 13 is comprised of a satellite 30, a plurality of receive antennas 32, a plurality of transmit antennas 31, a wide area antenna 35, and a signal processor 36. Respective pluralities of feed horns 33, 34 are provided to feed data to and from the respective transmit and receive antennas 31, 32. The wide area antenna is provided for communicating control signals between the user terminals 11, 12 and the network control center 14. The network control center 14 comprises a control processor 15 for generating configuration and control signals that link the user terminals 11, 12 by way of the satellite relay system 13, and an antenna 16 coupled to the control processor 15 for transmitting and receiving the control signals.

The plurality of receive antennas 32 operate in a first frequency band and produce a first plurality of beams (shown in FIG. 5) that cover a predefined area. The plurality of receive antennas 32 are adapted to receive frequency division multiplexed data from the first user terminal 11 on a first beam. The plurality of transmit antennas 31 operate in a second frequency band and produce a second plurality of beams that cover the predefined area. The plurality of transmit antennas 31 are adapted to transmit the time division multiplexed data to the second user terminal 12 on a second beam. It is to be understood that the second beam may be geographically colocated with the first beam, depending upon the respective locations of the source and destination user terminals 11, 12.

The signal processor 36 is adapted to demodulate frequency division multiplexed data received on the first beam from the first user terminal 11, route the demodulated data so that it is transmitted on the second beam to the second user terminal 12, remodulate the demodulated data to provide encoded data comprising time division multiplexed data, and transmit the frequency division multiplexed data on the second beam to the second user terminal 12. It is to be understood that other multiplexing schemes may be readily employed, and that the present invention is not limited to the herein-described multiplexing schemes.

Figure 2:
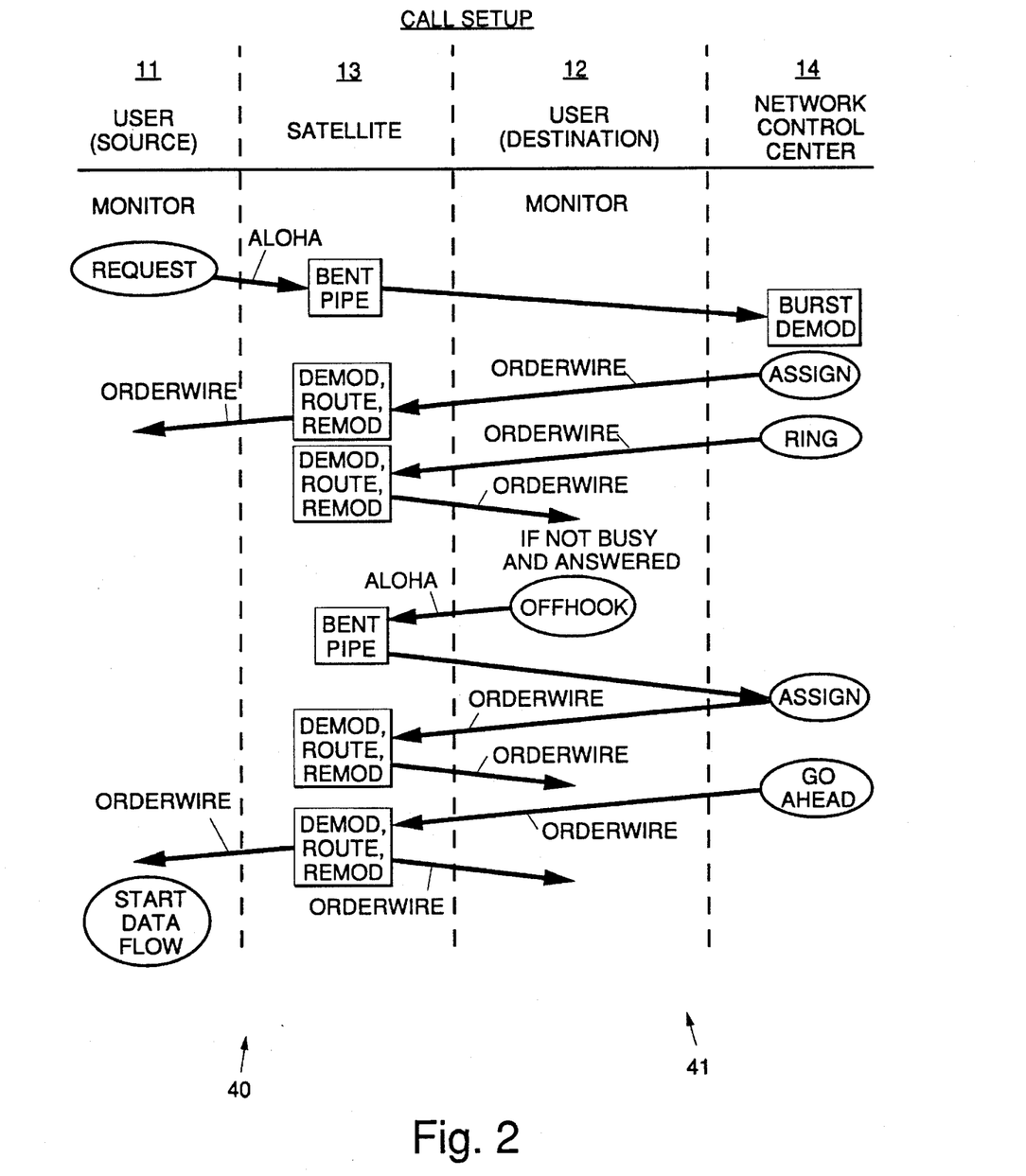
FIG. 2 illustrates the signal flow of a call setup portion of a communication protocol in accordance with the principles of the present invention for use with the satellite communication system of FIG. 1.
Figure 3A:
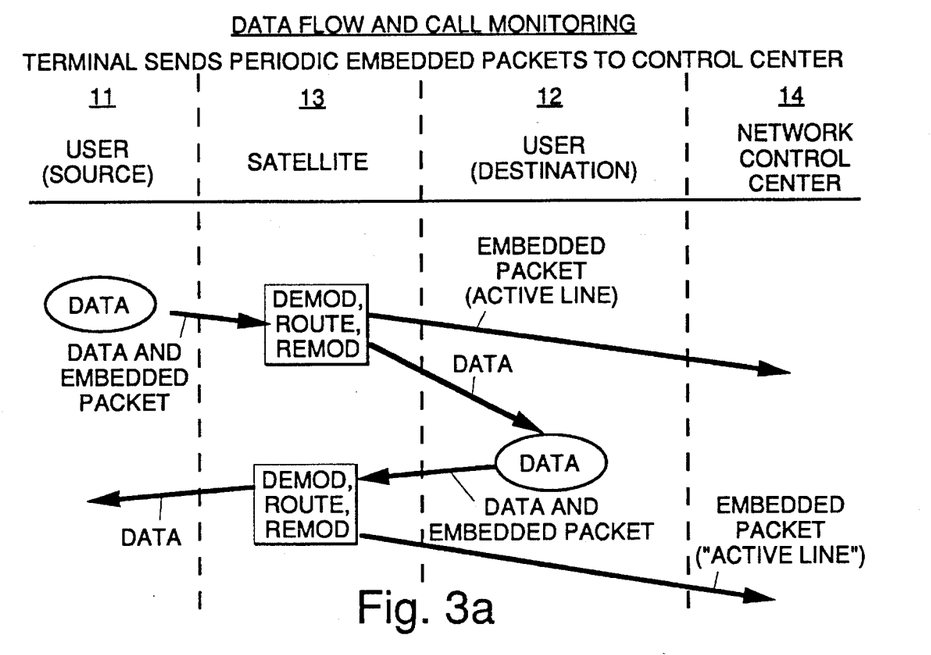
FIG. 3a illustrates the signal flow of a data flow and call monitoring portion of the present communication protocol using terminal packets.
Figure 3B:
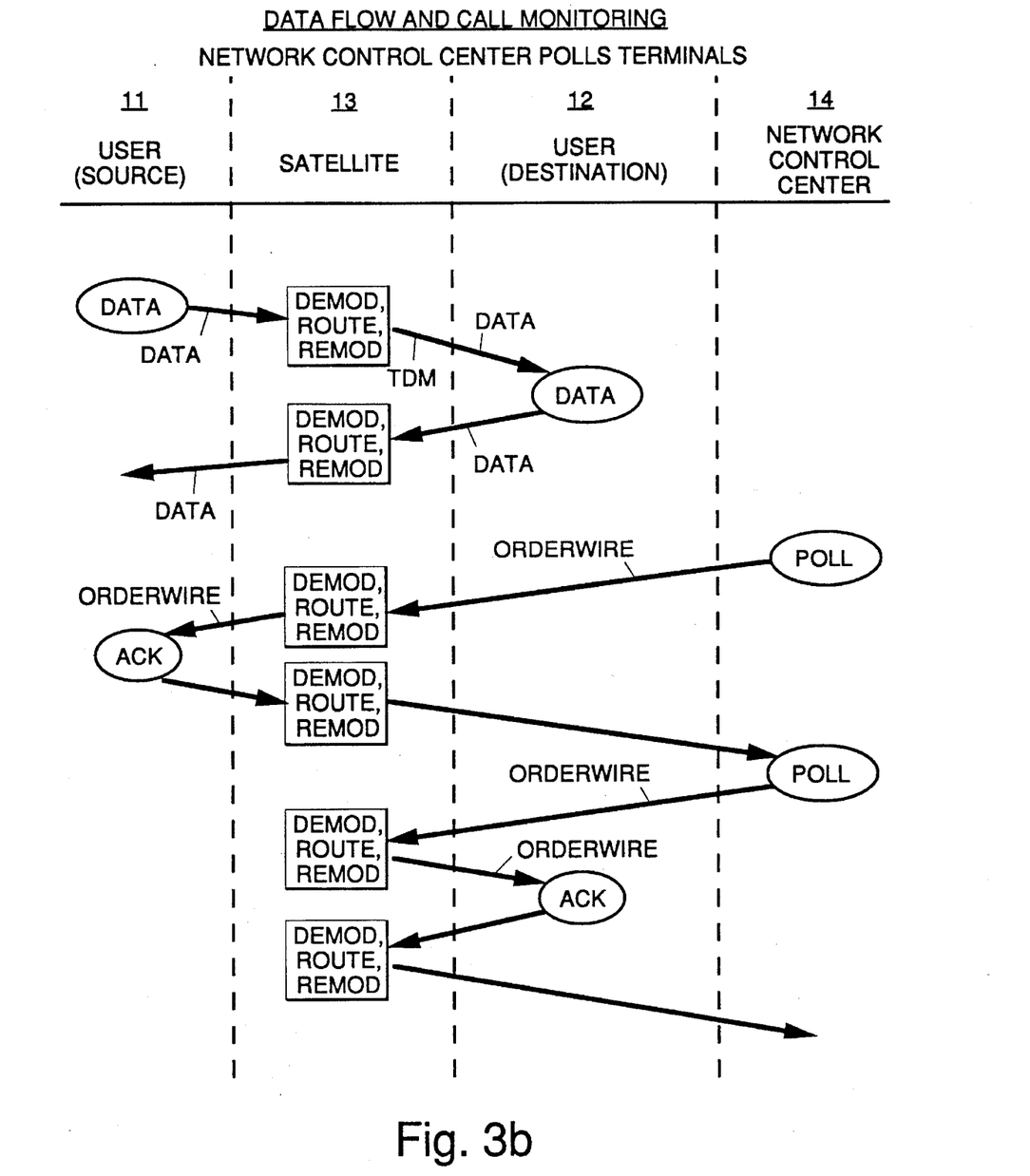
FIG. 3b illustrates the signal flow of a data flow and call monitoring portion of the present communication protocol using terminal polling.
Figure 4A:
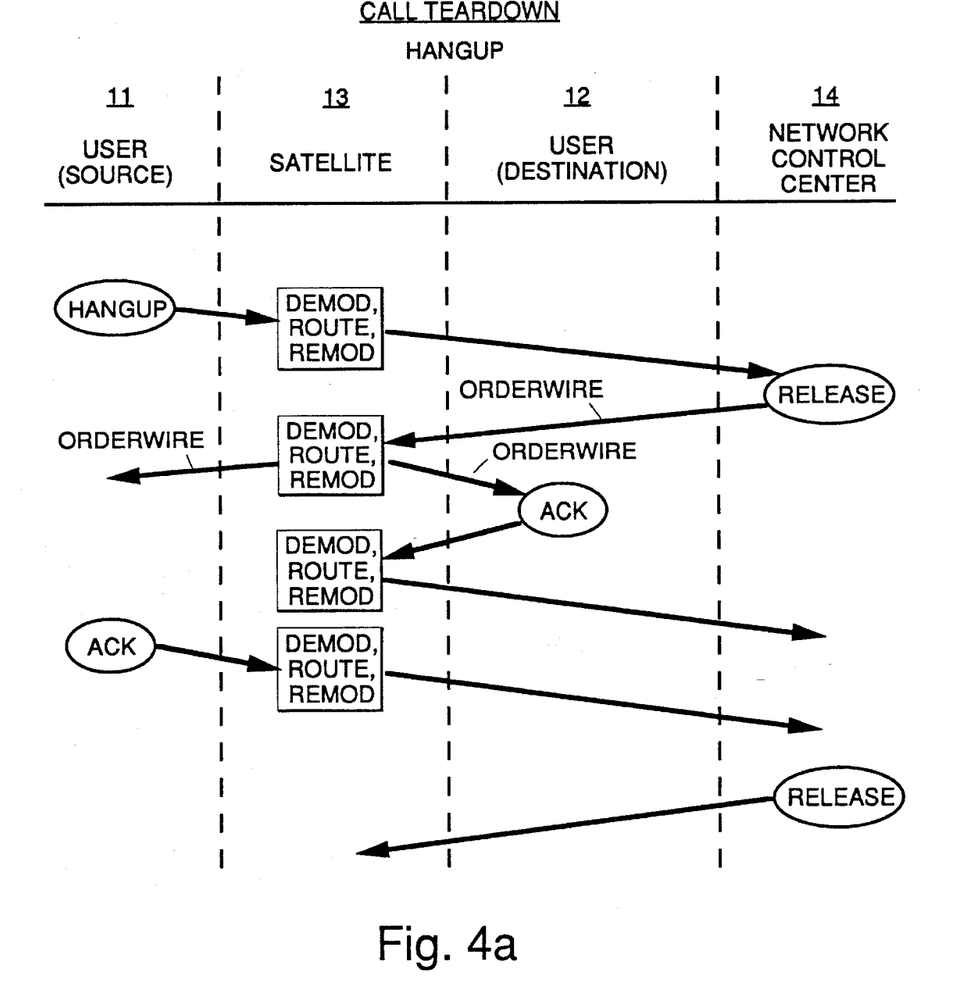
FIG. 4a illustrates the signal flow of a call teardown portion of the present communication protocol when a terminal hangs up.
Figure 4B:
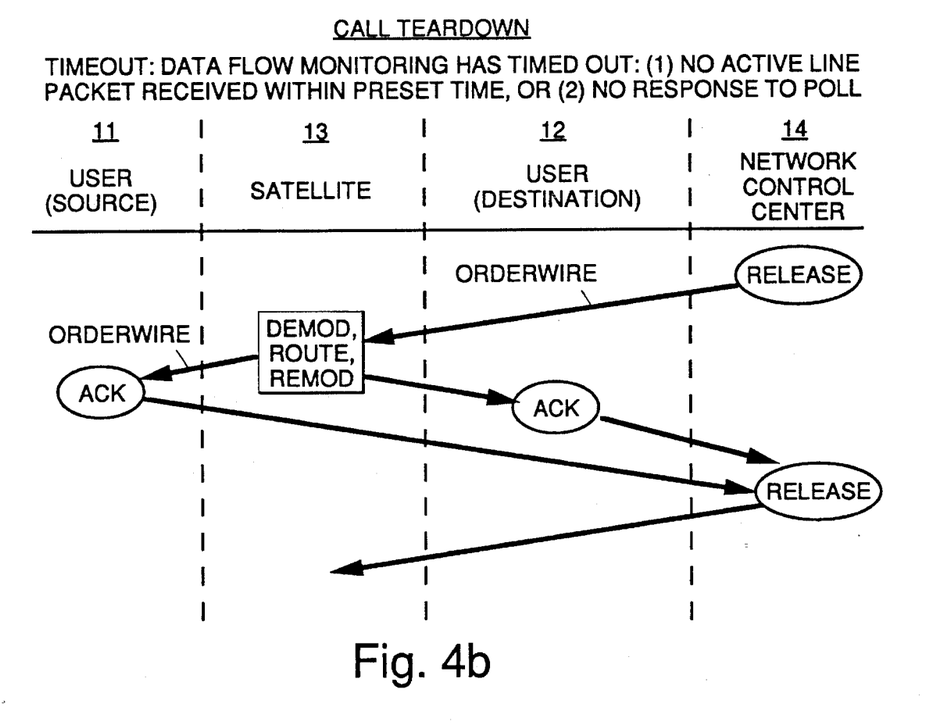
FIG. 4b illustrates the signal flow of a call teardown portion of the present communication protocol when there is a timeout.

The illustrations shown in FIGS. 2–4 show portions of the present communication protocol or method 40. FIG. 2 illustrates the signal flow of a call setup portion 41 of the communication method 40. In order to gain access to the system 10, a call setup sequence is implemented between a source user terminal 11, the network control center 14, and a destination user terminal 12.

Operational source and user terminals 11, 12 continually monitor downlink frequencies to determine which beam they are in. Each terminal scans through each of the downlink frequencies at each polarization and collects bit error measurements on known bits on the downlink data stream. Each terminal selects the strongest frequency determined by the fewest measured bit errors. Beam identification is embedded in framing information and this information is used by each terminal to identify which beam it is in.

A source user terminal 11 must request a physical channel to transmit on. This is done by generating source and destination IDs and identifying which beam the terminals are in. The source user terminal 11 then sends the above information to the network control center 14 by randomly choosing among allowable frequencies within the wide area coverage beam, and organizing the data that is to be transmitted into a packet. This packet has a standardized fore, at called high-level data link control (HDLC), which is similar to the format used on the D channel in the ISDN.

The source user terminal 11 bursts the packet to the satellite relay system 13 where it is translated in frequency and amplified and sent to the network control center 14 without using on-board demodulation and remodulation. This is known as a bent-pipe architecture. The network control center 14 then uses its demodulators to access these packets as they are burst to it.

The source user terminal 11 requests a physical channel to transmit on. This is referred to as call setup. Call setup is achieved by generating source and destination IDs and identifying which beam the source user terminal 11 is in. The source user terminal 11 then sends the above information to the network control center 14 by randomly choosing among allowable frequencies within the wide area coverage beam, and organizing the data that is to be transmitted into a packet. This packet has a standardized format, similar to the format used on the D channel in the ISDN. A high-level data link control (HDLC) protocol is used.

The source user terminal 11 sends the information to the network control center 14 by randomly choosing among allowable frequencies within the wide area coverage beam, and organizing the data into the data packet. This data packet has a standardized format, known as a high-level data link control (HDLC) packet. The source user terminal 11 then bursts the data packet to the satellite relay system 13 where it is translated in frequency, amplified, and retransmitted to the network control center 14 without using the demodulation and remodulation processes. This is known as a bent-pipe architecture. The network control center 14 employs demodulators that access the data packets as they are burst to it.

If there is no contention between the source and destination user terminals 11, 12, in that two terminals 11, 12 are not trying to burst on the same channel at the same time, then an acknowledgement signal is sent to the source user terminal 11 by the network control center 14 by way of an "orderwire" channel. The network control center 14 determines whether contention has occurred by computing a cyclic redundancy check (CRC) code for the packet and comparing this against the transmitted CRC.

If there is no contention between the source and destination user terminals 11, 12, in that two terminals 11, 12 are not trying to burst on the same channel at the same time, then an acknowledgement signal is sent to the source user terminal 11 by the network control center 14 by way of the "orderwire" channel. However, if the source user terminal does not receive an acknowledgement signal after a sufficient time delay (for example, twice the geosynchronous altitude delay or about 0.25 seconds) then it waits another period of time, the length of which is chosen randomly to avoid contention occurring again and again, and retransmits the data packet. This is referred to herein as an "Aloha" random access technique.

Along with the acknowledgement signal, the network control center 14 assigns the source user terminal 11 to a particular uplink channel and a downlink channel. This request cycle using the Aloha channel and channel assignment using the orderwire channel may take several iterations if uplink interference is a problem for some TDM channels. The orderwire uplink channel is the uplink channel of the network control center 14. A second uplink frequency may be used to communicate with or to configure the router 80 in the satellite relay system 13. The orderwire uplink processes information that is transmitted to the source and destination user terminals 11, 12. This information is broadcast, or more precisely multicast on preassigned agreed upon channels of every downlink beam. Thereafter, the uplinked data is demodulated, routed to every downlink beam where it is multiplexed with other data channels, then remodulated and downlinked to every user terminal. Each user terminal continually monitors this downlink channel and can recognize and extract messages addressed to it.

The orderwire uplink channel (or channels) is the channel of the network control center 14. A second uplink channel may be used to communicate with or to configure the router in the satellite relay system 13. The orderwire uplink channel processes information that is transmitted to the source and destination user terminals 11, 12. This information is broadcast, or more precisely multicast on, say, every channel 1, for example, of every downlink beam. Thereafter, the uplinked data is demodulated, routed to every downlink beam where it is time division multiplexed with other data channels, then remodulated and downlinked to every user terminal 11, 12. Each user terminal 11, 12 continually monitors this downlink channel and can recognize and extract messages addressed to it.

The orderwire uplink is only from the network control center 14 to the satellite relay system 13, and uses the demodulation and remodulation. The orderwire downlink is only from the satellite relay system 13 to the user terminals 11, 12, and uses the demodulation and remodulation. Each user terminal 11, 12 monitors its orderwire downlink channel to recognize and extract messages addressed to it.

Next, the network control center 14 calls the destination user terminal 12. Again, this takes place by way of the orderwire channel. The destination user terminal 12 accesses data addressed to it off the orderwire channel, and if it is not busy, it sends an OFFHOOK message to the network control center 14 using the Aloha channel along with data indicative of which beam it is in and best uplink frequency. Acknowledgement from the network control center 14 is performed by way of the orderwire channel, and the destination user terminal 12 is assigned its uplink and downlink channels (frequency for FDM, and time slot for TDM).

Data flow, call monitoring and terminal polling will now be described. FIG. 3a illustrates the signal flow of a data flow and call monitoring portion of the communication method 40 using terminal packets. FIG. 3b illustrates the signal flow of a data flow and call monitoring portion of the communication method 40 using terminal polling.

Once the source and destination user terminals 11, 12 have been assigned their beams and channels, the network control center 14 reconfigures the routes to set-up the end-to-end data link. Thereafter, data transfer between terminals 11, 12 is generally independent of the network control center 14. Once the communication link between the user terminals 11, 12 is established, input data generated at a source user terminal 11 is frequency division multiplexed and transmitted to the satellite relay system 13. The satellite relay system 13 demodulates the data, routes it so that it is retransmitted on a beam that communicates with the destination user terminal 12, remodulates the data, and then transmits the time division multiplexed data to the destination user terminal 12.

However, it is necessary for the network control center 14 to monitor the calls so that system resources are not unnecessarily tied up if a connection is lost. This is achieved by causing both terminals 11, 12 to send periodic messages (HDLC packets) embedded in the data stream to the network control center 14 (FIG. 3a) indicating that they are active on the network. Alternatively, the network control center 14 may periodically poll each terminal 11, 12 (FIG. 3b) and terminate a call if either terminal 11, 12 is unresponsive or provides a signal indicating that it is ONHOOK (has hung up).

Call termination will now be described. FIG. 4a illustrates the signal flow of a call teardown portion of the communication method 40 when a terminal hangs up. FIG. 4b illustrates the signal flow of a call teardown portion of the communication method 40 when there is a timeout.

Referring to FIG. 4a, if a call is terminated, in that the network control center 14 receives a HANGUP signal from a terminal 11, 12, or either terminal 11, 12 is unresponsive to polling, or either terminal 11, 12 fails to send a monitoring message to the network control center 14 within a required time period, a number of system resources are released. These resources include the uplink channels for both terminals 11, 12, including the satellite demodulators, the downlink channels for both terminals 11, 12, and the path through the router 80 that was reserved for the terminals 11, 12. Signals are sent to both terminals 11, 12 by way of the orderwire channel to cease transmitting. Each terminal 11, 12 may then send an acknowledgement signal by way of the Aloha channel (wide area coverage beam) to the network control center 14 to reduce interference with other terminals.

Referring to FIG. 4b, if a timeout occurs, in that data flow monitoring has timed-out if no active line packet is received within a predetermined time period, or if no response is received to a polling request, the system resources are released. The signals transferred between the network control center 14, the satellite relay system 13 and the user terminals 11, 12 are substantially the same as for the call termination procedure described with reference to FIG. 4a.

Figure 5:
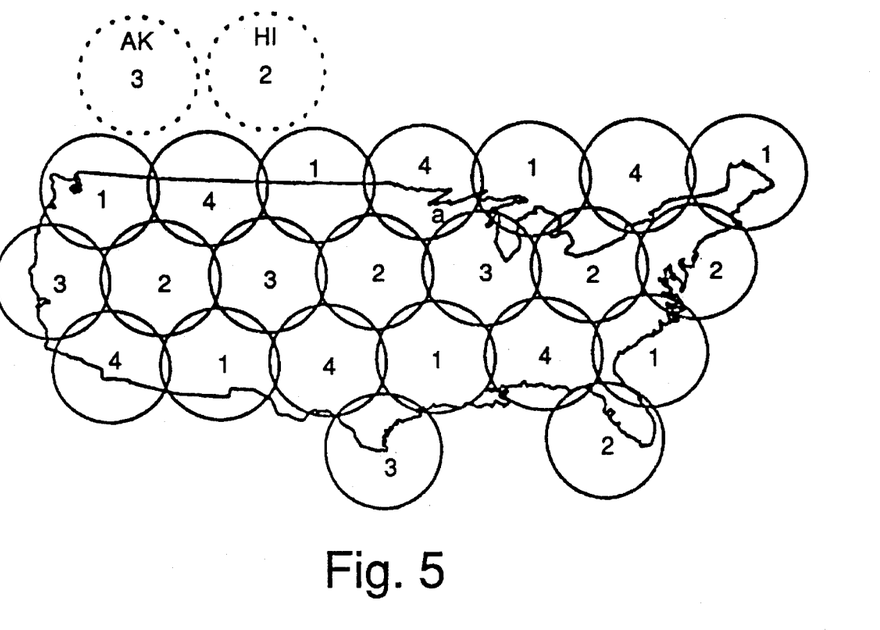
FIG. 5 illustrates a typical beam pattern employed by the system of FIG. 1.
Figure 6A:
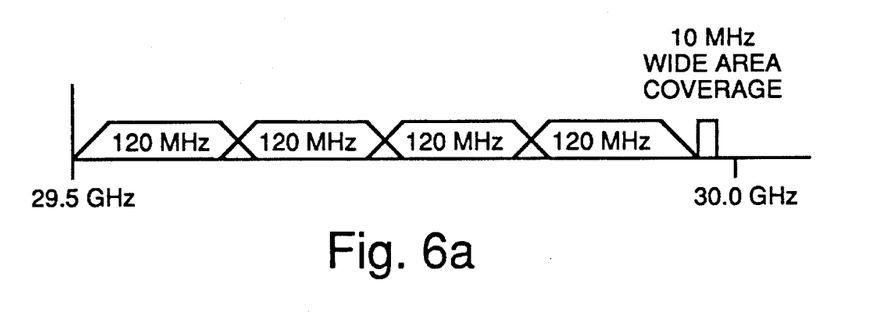
FIGS. 6a and 6b show the characteristics of uplink and downlink beams of the beam pattern shown in FIG. 4.
Figure 6B:
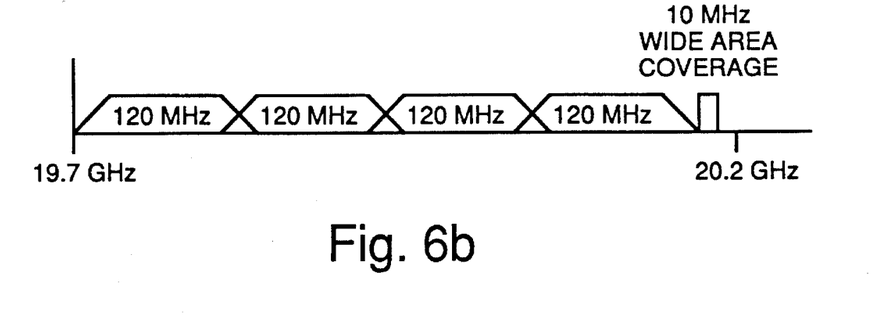

FIG. 5 illustrates a typical beam pattern employed by the system 10 of FIG. 1. FIG. 5 shows the use of 24 beams that completely cover a desired operating area; in this case the continental United States, Alaska (AK) and Hawaii (HI). The respective beams are numbered with an identifying number (1, 2, 3, 4) that indicates which respective subband is assigned to each beam. The subbands are illustrated in FIGS. 6a and 6b. More particularly, FIGS. 6a and 6b show the characteristics of uplink and downlink beams of the beam pattern shown in FIG. 5. As can be seen from FIG. 5, twenty-four beams each having two polarization states (fight hand circularly polarized, RHCP, left hand circularly polarized, LHCP), are employed to obtain full coverage of the United States. However, it is to be understood that different linear polarization states may be readily employed in the present system 10. The four subbands shown in FIG. 5 are thus reused six times to achieve full coverage. FIG. 6a shows the transmit bands that comprise four 120 MHz subbands and a 10 MHz wide area coverage (CONUS) subband that extends from 29.5 GHz to 30.0 GHz. FIG. 6b shows the receive bands that comprise four 120 MHz subbands and a 10 MHz wide area coverage (CONUS) subband that extends from 19.7 GHz to 20.2 GHz. These frequencies are in the Ka band.

Thus there has been described a new and improved communication protocol for use with a high data rate satellite communication system that provides for data, voice and video communication between individuals. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A communication method for use with high data rate satellite communication system that comprises a plurality of user terminals which modulate and demodulate input and output signals, which user terminals are linked by and communicate with each other by way of a satellite relay system, and wherein a network control center provides command signals that control the satellite relay system and coordinates linking of terminals to each other, said method comprising the steps of:

generating a signal requesting connection from a source user terminal to a destination user terminal by way of the network control center using a command channel;

generating an acknowledgment signal from the network control center acknowledging the request;

allocating a transmission channel for the source user terminal;

contacting the destination user terminal from the network control center by way of the satellite relay system;

contacting the destination user using an orderwire channel by way of the network control center;

accepting the call by the destination user and acknowledging same to the network control center;

assigning a transmission channel for the destination user terminal; and initiating a go-ahead command from the network control center and sending it to the source user using the orderwire channel.

2. The communication method of claim 1 wherein the step of generating a signal requesting connection from a source user terminal to a destination user terminal is repeated until acknowledgment is received from the network control center.

3. The communication method of claim 1 which further comprises the steps of: sending modulated user data containing an embedded packet from the source user terminal to the satellite relay system;

demodulating the user data and the embedded packet;

extracting the embedded packet from the user data;

remodulating the extracted packet;

sending the remodulated extracted packet to the network control center;

routing and remodulating the user data; and sending the remodulated user data to the destination user terminal.

4. The communication method of claim 1 which further comprises the steps of:

sending modulated user data from the source user terminal to the satellite relay system;

demodulating the user data;

routing and remodulating the user data; and sending the remodulated user data to the destination user terminal periodically sending polling signals from the network control center to the source and destination user terminals by way of the satellite relay system; and acknowledging the polling signals from the source and destination user terminals by sending acknowledgment signals to the network control center by way of the satellite relay system.

5. The communication method of claim 3 which further comprises the steps of:

sending a hangup signal from the source user terminal to the network control center;

sending a release signal from the network control center to the source and destination user terminals by way of the satellite relay system using the orderwire channel;

acknowledging the hangup signal by sending acknowledgment signals from the respective source and destination user terminals to the network control center by way of the satellite relay system.

6. The communication method of claim 5 wherein the step of sending a hangup signal from the source user terminal to the network control center further comprises the steps of:

modulating the hangup signal at the source user terminal;

demodulating the hangup signal at the satellite relay system;

routing and remodulating the hangup signal; and sending the remodulated hangup signal to the network control center.

7. The communication method of claim 5 wherein the step of sending a release signal from the network control center to the source and destination user terminals further comprises the steps of:

modulating the release signal at the network control center;

demodulating the release signal at the satellite relay system; routing and remodulating the release signal; and sending the remodulated release signal to the network control center.

8. The communication method of claim 5 wherein the step of acknowledging the hangup signal by sending acknowledgment signals from the respective source and destination user terminals further comprises the steps of:

modulating the acknowledgment signals at the source and destination user terminals;

demodulating the acknowledgment signals at the satellite relay system;

routing and remodulating the acknowledgment signal; and sending the remodulated acknowledgment signal to the network control center.

9. The communication method of claim 4 which further comprises the steps of:

sending a hangup signal from the source user terminal to the network control center;

sending a release signal from the network control center to the source and destination user terminals by way of the satellite relay system using the orderwire channel;

acknowledging the hangup signal by sending acknowledgment signals from the respective source and destination user terminals to the network control center by way of the satellite relay system.

10. The communication method of claim 9 wherein the step of sending a hangup signal from the source user terminal to the network control center further comprises the steps of:

modulating the hangup signal at the source user terminal;

demodulating the hangup signal at the satellite relay system;

routing and remodulating the hangup signal; and sending the remodulated hangup signal to the network control center.

11. The communication method of claim 9 wherein the step of sending a release signal from the network control center to the source and destination user terminals further comprises the steps of:

modulating the release signal at the network control center;

demodulating the release signal at the satellite relay system;

routing and remodulating the release signal; and sending the remodulated release signal to the source and destination user terminals.

12. The communication method of claim 9 wherein the step of acknowledging the hangup signal by sending acknowledgment signals from the respective source and destination user terminals further comprises the steps of:

modulating the acknowledgment signals at the source and destination user terminals;

demodulating the acknowledgment signals at the satellite relay system; routing and remodulating the acknowledgment signals; and sending the remodulated acknowledgment signals to the network control center.

13. The communication method of claim 3 which further comprises the steps of:

monitoring the embedded packets sent by the source user terminal;

if an embedded packet is not received from the source user terminal within a predetermined time period, then sending a release signal from the network control center to the source and destination user terminals by way of the satellite relay system using the orderwire channel; and acknowledging the hangup signal by sending acknowledgment signals from the respective source and destination user terminals to the network control center by way of the satellite relay system.

14. The communication method of claim 13 wherein the step of sending a release signal from the network control center to the source and destination user terminals further comprises the steps of:

modulating the release signal at the network control center;

demodulating the release signal at the satellite relay system;

routing and remodulating the release signal; and sending the remodulated release signal to the source and destination user terminals.

15. The communication method of claim 4 which further comprises the steps of:

monitoring the acknowledgment signals sent by the source and destination user terminals in response to the polling signals;

if acknowledgment signals are not received from the source and destination user terminal within a predetermined time period, then sending a release signal from the network control center to the source and destination user terminals by way of the satellite relay system using the orderwire channel; and acknowledging the hangup signal by sending acknowledgment signals from the respective source and destination user terminals to the network control center by way of the satellite relay system.

16. The communication method of claim 15 wherein the step of sending a release signal from the network control center to the source and destination user terminals further comprises the steps of:

modulating the release signal at the network control system:

demodulating the release signal at the satellite relay system;

routing and remodulating the release signal; and sending the remodulated release signal to the source and destination user terminals.

17. A communication method for use with high data rate satellite communication system that comprises a plurality of user terminals that are linked by and that communicate with each other by way of a satellite relay system, and wherein a network control center provides command signals that control the satellite relay system and coordinates linking of terminals to each other, said method comprising the steps of:

sending modulated user data containing an embedded packet from the source user terminal to the satellite relay system;

demodulating the user data and the embedded packet;

extracting the embedded packet from the user data;

remodulating the extracted packet;

sending the remodulated extracted packet to the network control center;

routing and remodulating the user data; and sending the remodulated user data to the destination user terminal.

18. A communication method for use with high data rate satellite communication system that comprises a plurality of user terminals that are linked by and that communicate with each other by way of a satellite relay system, and wherein a network control center provides command signals that control the satellite relay system and coordinates linking of terminals to each other, said method comprising the steps of:

sending modulated user data from the source user terminal to the satellite relay system;

demodulating the user data;

routing and remodulating the user data; and sending the remodulated user data to the destination user terminal periodically sending polling signals from the network control center to the source and destination user terminals by way of the satellite relay system; and acknowledging the polling signals from the source and destination user terminals by sending acknowledgment signals to the network control center by way of the satellite relay system.

19. A communication method for use with high data rate satellite communication system that comprises a plurality of user terminals that are linked by and that communicate with each other by way of a satellite relay system, and wherein a network control center provides command signals that control the satellite relay system and coordinates linking of terminals to each other, said method comprising the steps of:

sending a hangup signal from the source user terminal to the network control center;

in response to receipt of the hangup signal at the network control center, sending a release signal from the network control center to the source and destination user terminals by way of the satellite relay system using an orderwire channel;

acknowledging the hangup signal by sending acknowledgment signals from the respective source and destination user terminals to the network control center by way of the satellite relay system.

20. A communication method for use with high data rate satellite communication system that comprises a plurality of user terminals that are linked by and that communicate with each other by way of a satellite relay system, and wherein a network control center provides command signals that control the satellite relay system and coordinates linking of terminals to each other, said method comprising the steps of:

monitoring the embedded packets sent by the source user terminal;

if an embedded packet is not received from the source user terminal within a predetermined time period, then sending a release signal from the network control center to the source and destination user terminals by way of the satellite relay system using an orderwire channel; and acknowledging the hangup signal by sending acknowledgment signals from the respective source and destination user terminals to the network control center by way of the satellite relay system.

21. A communication method for use with high data rate satellite communication system that comprises a plurality of user terminals that are linked by and that communicate with each other by way of a satellite relay system, and wherein a network control center provides command signals that control the satellite relay system and coordinates linking of terminals to each other, said method comprising the steps of:

monitoring the acknowledgment signals sent by the source and destination user terminals in response to the polling signals;

if acknowledgment signals are not received from the source and destination user terminal within a predetermined time period, then sending a release signal from the network control center to the source and destination user terminals by way of the satellite relay system using an orderwire channel; and acknowledging the hangup signal by sending acknowledgment signals from the respective source and destination user terminals to the network control center by way of the satellite relay system.

* * * * *